United States Patent
Bhowmik et al.

(10) Patent No.: US 7,325,928 B2
(45) Date of Patent: Feb. 5, 2008

(54) RESOLUTION MULTIPLICATION TECHNIQUE FOR PROJECTION DISPLAY SYSTEMS

(75) Inventors: Achintya K. Bhowmik, Milpitas, CA (US); Shida Tan, Milpitas, CA (US); Jeff A. Bonnington, West Linn, OR (US)

(73) Assignee: Intel Corporation, Santa Clara, CA (US)

( * ) Notice: Subject to any disclaimer, the term of this patent is extended or adjusted under 35 U.S.C. 154(b) by 194 days.

(21) Appl. No.: 11/057,458

(22) Filed: Feb. 14, 2005

(65) Prior Publication Data

US 2006/0181683 A1 Aug. 17, 2006

(51) Int. Cl.
*G03B 21/00* (2006.01)
*G03B 21/26* (2006.01)

(52) U.S. Cl. .......................... 353/30; 353/121
(58) Field of Classification Search ............ 353/30, 353/34, 82, 89, 94, 121; 348/195, 196, 206
See application file for complete search history.

(56) References Cited

U.S. PATENT DOCUMENTS

| | | | | | |
|---|---|---|---|---|---|
| 3,583,804 | A | * | 6/1971 | Mueller | ........................ 355/2 |
| 5,262,979 | A | * | 11/1993 | Chao | ........................... 365/49 |
| 6,082,862 | A | * | 7/2000 | Popovich | ..................... 353/30 |
| 6,863,400 | B1 | * | 3/2005 | Liang | ........................... 353/20 |
| 6,945,652 | B2 | * | 9/2005 | Sakata et al. | ................. 353/30 |

\* cited by examiner

*Primary Examiner*—Rodney Fuller
(74) *Attorney, Agent, or Firm*—Trop, Pruner & Hu, P.C.

(57) ABSTRACT

A projection display may be formed by an imager which creates a portion of each of a plurality of spatially separated segments which together make up an overall image. The imager may produce one of those segments at any given instant of time. That segment is then replicated to fill each of the segments that form the overall image area. However, the segments that correspond to locations where that image portion should not exist are filtered out so that only one image portion for the correct segment is displayed. Each of the other segments may be produced in a time sequential fashion so that sequentially the segments fill the entire image. Thus, using this technique, substantially higher resolution may be achieved from a projection display system using fewer number of pixels in the microdisplay, in some embodiments.

9 Claims, 2 Drawing Sheets

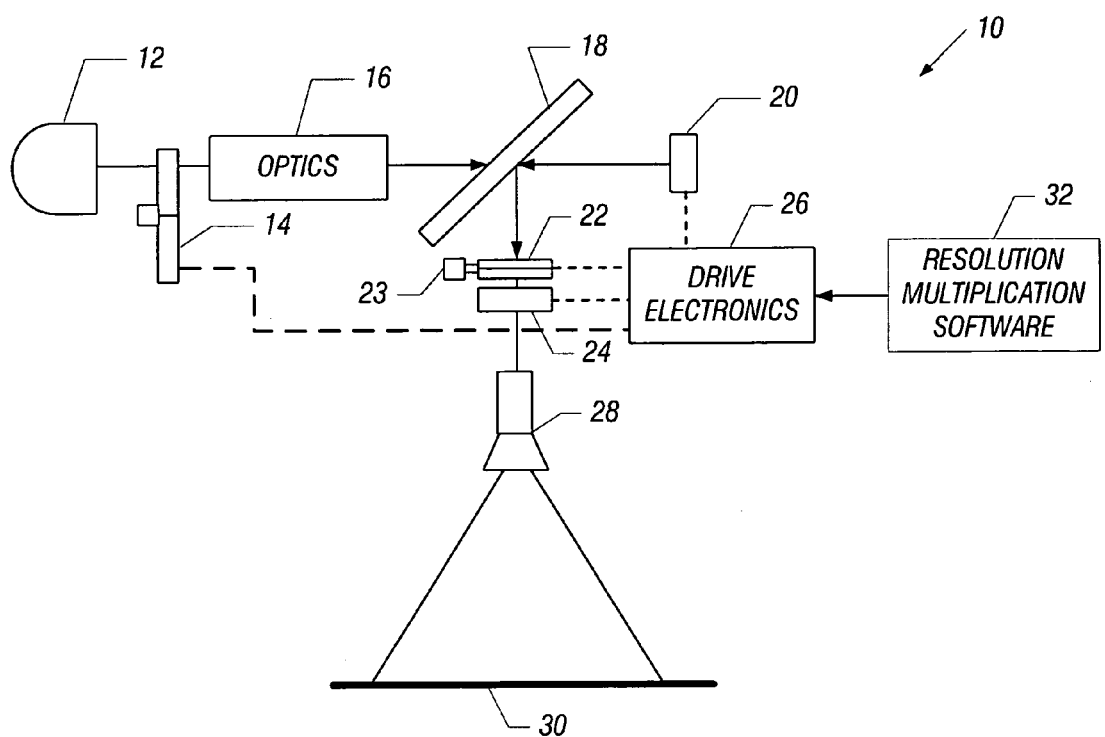
FIG. 1
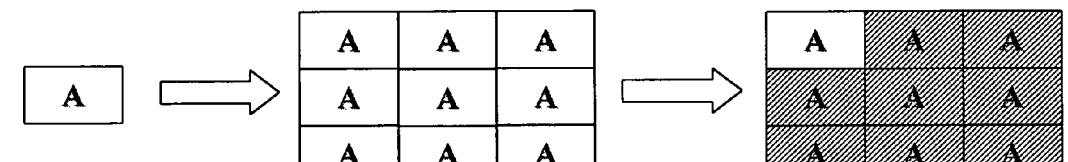
FIG. 2A
FIG. 2B FIG. 2C FIG. 2D

RESOLUTION MULTIPLICATION TECHNIQUE FOR PROJECTION DISPLAY SYSTEMS

BACKGROUND

This invention relates generally to projection display systems using microdisplay imagers.

Projection display systems may be used to project a high resolution display onto a larger area. A microdisplay may create an image which is projected onto a projection screen. With the advent of high definition television systems, digital cinema projectors, and high density graphic display monitors, the need for higher resolution is increasing.

Projection display systems based on various microdisplay technologies such as liquid crystal-on-silicon (LCOS), digital light processor (DLP) using digital micromirror devices (DMD), and high temperature polysilicon (HTPS) based transmissive liquid crystal display panels are available on the market with about one megapixel resolution. However, there is a need for displays with spatial resolutions on the order of 2 megapixels and higher and it would be highly desirable to reduce the cost of these systems.

Each of those imager panels modulates light that originates from a lamp of a projection display system. In typical projection display systems, the light output is formatted with optics to deliver a uniform illumination level onto the surface of the imager. The imager forms a pictorial image by modulating the illumination into spatially distinct tones, ranging from dark to light, based on supplied video data. Additional optics then relay and magnify the modulated illumination pattern onto a screen for viewing.

The imager typically includes an array of pixel cells, each of which is electrically controllable to establish the intensity of a pixel of the projected image. In some projection display systems, images are transmissive and in other they are reflective. For present purposes, both transmissive and reflected images are contemplated.

Thus, there is a need for system-level enhancement of the image resolution that provides ways to achieve higher resolution on the screen of the projection display systems than that directly provided by the imagers employed in the systems.

BRIEF DESCRIPTION OF THE DRAWINGS

FIG. 1 is a schematic depiction of one embodiment of the present invention;

FIGS. 2A-2D schematically depict the mode of operation of the embodiment of FIG. 1 in accordance with one embodiment of the present invention.

DETAILED DESCRIPTION

Figure 3:
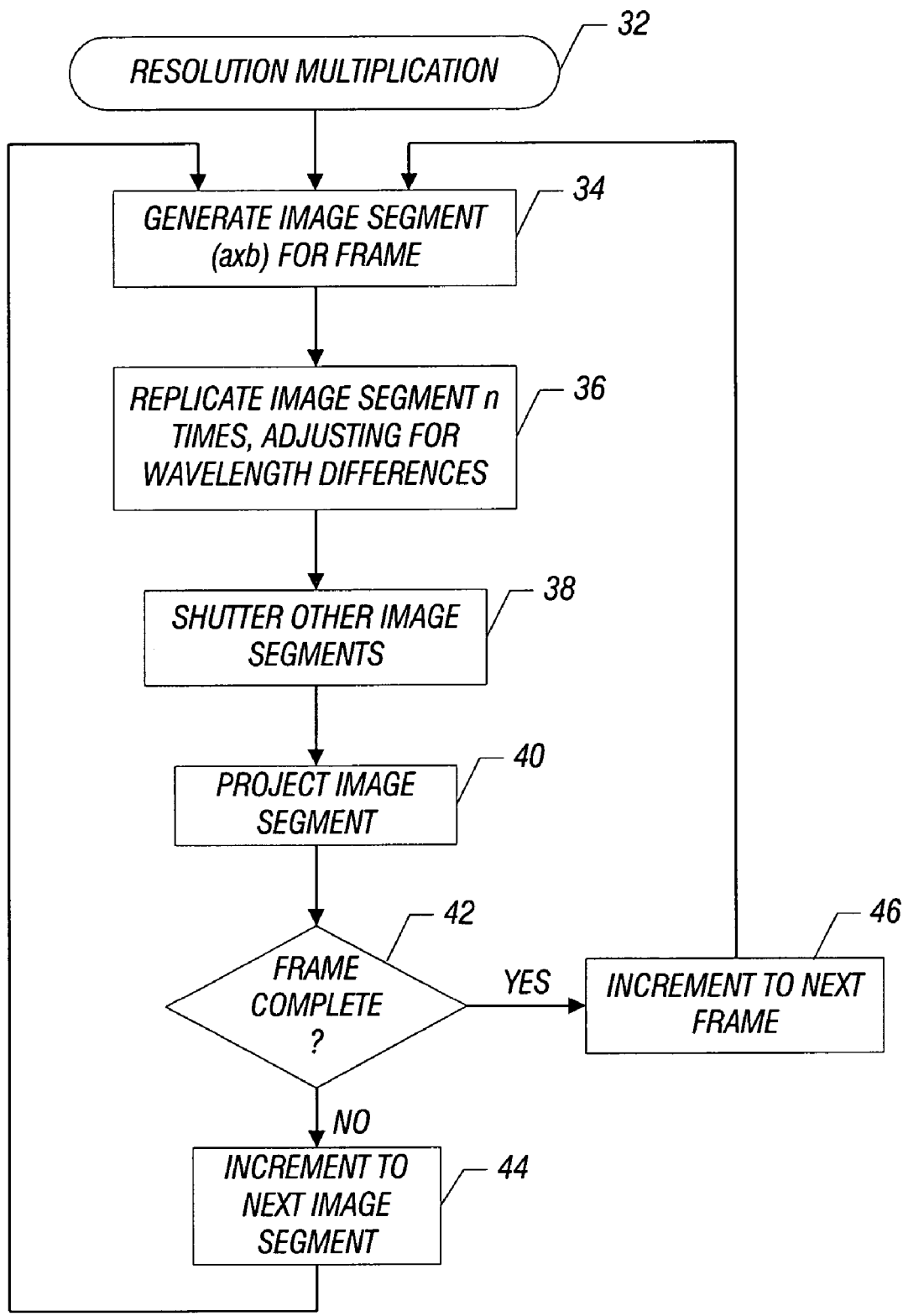
FIG. 3 is a flow chart for software for one embodiment of the present invention.

Referring to FIG. 1, a projection display system 10 includes a lamp such as an ultra high pressure (UHP) mercury lamp 12, a color wheel 14, formatting optics 16, and a polarization beam splitter 18. Thus, light originating from the lamp 12 passes through the color wheel 14 which rotates and progressively filters or passes light of particular wavelengths. In one embodiment, the color wheel 14 successively passes light beams of the three primary colors. Those beams are then formatted sequentially by the optics 16. The optics 16 may include a homogenizer, polarization recovery, and beam shaping optics. The beam splitter 18 passes a particular color image to the diffraction grating 22 that creates copies of the image. The copies of the image are selectively passed by an optical shutter 24. The projection lens 28 then projects the image, or at least a portion thereon, to a screen 30.

The basic image may be produced by a microdisplay 20 such as a liquid crystal-on-silicon microdisplay with an axb pixel count. However, as additional examples, the microdisplay 20 may also be a DMD or a high temperature polysilicon microdisplay. The color wheel 14, the diffraction grating 22, and the optical shutter 24 are controlled by drive electronics 26. In one embodiment, the drive electronics 26 may include a programmable device that executes resolution multiplication software 32.

The microdisplay 20 may be a microdisplay panel or panels having 1/n times the number of the pixel count intended for the final projected image, where n is the desired reduction ratio of the pixel count. For example, a one megapixel display, with approximately a 9× resolution enhancement scheme, would use microdisplay panels having as low as about 100,000 pixels. The projection image may be a three-panel system, with one panel dedicated for each primary color, a one-panel field sequential color system, where the panel displays the primary colors in sequence, or a two-panel system where one of the panels is dedicated for a primary color while the other panel switches between the other two colors.

The field sequential operation may be implemented by various methods including color wheels, color switches, or scrolling color prisms. The microdisplay panels may use various technologies including liquid crystal-over-silicon, digital micromirror devices, high temperature polysilicon-based transmissive liquid crystal displays, and gradient light valves.

The image area of the video frame is divided into n segments. At any given time, only 1/n of the image signal is sent to the microdisplay 20 to generate 1/n of the area of the image. The entire image may be constructed through time division multiplexing, where the data corresponding to the n segments of the frame are sequentially applied to the microdisplay 20, one segment at a time.

Thus, referring to FIG. 2A, in this example, an overall image is divided into nine equal segments, A-I. However, the image may be divided into any desired number of segments. Then, as shown in FIG. 2B, the image portion A is generated by the imager. In FIG. 2C, the image portion A is replicated for each of the segments of an overall image. Those segments are filtered so that the image portion A appears only where it is supposed to (in the upper lefthand corner), in this example. Each of the other image portions B-I may be developed in substantially the same fashion.

The diffraction grating 22 may include an array of diffraction gratings (placed after a combining exit prism of the optical image) that create n identical copies of the image segment (e.g., the segment A in the example above) generated by the microdisplay imager device 20 (as indicated in FIG. 2C). The diffraction grating 22 may be a Ronchi ruling, or holographic chip, as two examples. For example, a 3×3, two-dimensional matrix may be created by transversely stacking two Ronchi rulings. One Ronchi ruling copies the image in a linear repeating series of images. Each of those images is repeated in a series traverse to the first series by the second Ronchi ruling to create an array of copies.

The optical shutter 24 is inserted in the light path after the grating 22 and before the projection lens 28. The shutter 24 may include a matrix of n pixels. Thus, for a 9× resolution enhancement, the shutter 24 contains a 3×3 matrix of nine pixels where each pixel matches with one image segment to be generated by the grating 22. The pixels in the shutter 24 can be turned on or off, allowing only one image copy to be projected on the screen 30 at any given time (as indicated in FIG. 2D). The shutter 24 may be a liquid crystal based, micromirror based, or single crystal based shutter, as a few additional examples.

The shutter control may be synchronized with the drive signal to the microdisplay by the drive electronics 26 in FIG. 1. This enables time division multiplexing of the image segments. The shutter 24 can be an electro-optical device including a liquid crystal material or a single crystal film of second order non-linear optical material sandwiched between two polarizers. As another example, the shutter 24 may be a microelectromechanical system device with n mirrors to switch the pixels on and off.

Since the image signal may be polychromatic, the grating 22 advantageously works for all primary wavelengths. However, the copies created for different primary wavelengths may be spatially shifted. The grating 22 may be mounted on a positioning device 23, such as a piezoelectric drive, which can be controllably moved relative to the microdisplay 20 to compensate for wavelength-based spatial differences, as indicated in FIG. 1. As another approach, a variable grating may be used such as a liquid crystal-based device. The characteristics of that grating may be controlled for each color synchronously with the display color field upload.

In accordance with one embodiment of the present invention, the resolution multiplication software 32 may begin by generating an image segment (axb) for a frame as indicated in block 34. The image segment may be replicated n times, adjusting for wavelength differences as indicated in block 36. All of the other image segments are then shuttered, as indicated in block 38, so that only the one image segment in the correct position, for example, in the upper lefthand corner, is displayed. That image segment is then projected at the appropriate location as indicated in block 40. If the frame is complete, as determined in diamond 42, then the next frame is processed as indicated in block 46. Otherwise, the image segment is incremented so that the next segment may be produced. Thus, if segment A is produced first, then segment B may be produced next, and so on.

As one result, the number of pixels in the projected image is higher than the number of pixels produced by the microdisplay 20 at any instance. Conversely, the microdisplay 20 produces fewer pixels at any instance than the number of pixels in the projected image.

Thus, in some embodiments of the present invention, one or more microdisplay panels may be used with significantly lower resolution in terms of the number of pixels than that of the projected image. This facilitates the reduction of the panel size compared to those utilized in conventional rear projection displays and office front projectors, which may dramatically reduce manufacturing costs in some embodiments. The reduction of the microdisplay panel size may also result in lower power dissipation, and simpler and lower cost drive electronics. On the otherhand, if microdisplay imagers with standard resolutions are used, substantially higher resolution may be achieved in the projection display systems employing the resolution enhancement scheme described above.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   dividing an image to be projected into a plurality of segments;
   replicating an image segment;
   using said replicated image segment to form an array of replicated image segments; and
   projecting said replicated image segments successively.

2. The method of claim 1 including filtering all but one of the replicated image segments.

3. The method of claim 1 including producing said image segment on a microdisplay having a size corresponding to the size of the image segment.

4. The method of claim 1 including using a microdisplay to project an image made up of said image segment, said microdisplay having fewer pixels than the overall image to be projected.

5. The method of claim 1 including producing an image portion for one segment, replicating said image portion to fill the entire image area, and filtering all of the replicated image portions except for one image portion.

6. The method of claim 5 including successively producing image portions for each segment in a time multiplexed fashion to form the image made up of a time sequence of spatially separated image portions.

7. The method of claim 5 including using a diffraction grating to replicate said image portions.

8. The method of claim 7 including using two Ronchi rulings to replicate said image portions.

9. The method of claim 7 including using a shutter to filter the image portions not to be displayed.

* * * * *